(12) United States Patent
Davis et al.

(10) Patent No.: US 8,817,802 B2
(45) Date of Patent: Aug. 26, 2014

(54) METHOD AND SYSTEM FOR PROVIDING HITLESS SWITCHING WHILE MAINTAINING A POWER EQUIVALENT BANDWIDTH (PEB) RATIO USING MULTIPLE CARRIERS

(75) Inventors: Wallace Davis, Scottsdale, AZ (US); Valentine J. Rhodes, Scottsdale, AZ (US); Michael Beeler, Jefferson, MD (US)

(73) Assignee: Comtech EF Data Corp., Tempe, AZ (US)

( * ) Notice: Subject to any disclaimer, the term of this patent is extended or adjusted under 35 U.S.C. 154(b) by 147 days.

(21) Appl. No.: 13/436,269

(22) Filed: Mar. 30, 2012

(65) Prior Publication Data

US 2012/0189017 A1 Jul. 26, 2012

Related U.S. Application Data

(60) Provisional application No. 61/578,774, filed on Dec. 21, 2011.

(51) Int. Cl.
*H04L 29/06* (2006.01)
*H04B 10/118* (2013.01)
*H04B 10/112* (2013.01)
*H04B 7/185* (2006.01)

(52) U.S. Cl.
CPC ........ *H04B 10/1129* (2013.01); *H04B 7/18582* (2013.01); *H04B 10/118* (2013.01)
USPC ............ 370/401; 370/320; 370/515; 370/516

(58) Field of Classification Search
USPC .................................. 370/320, 401, 515, 516
See application file for complete search history.

(56) References Cited

U.S. PATENT DOCUMENTS

| 4,797,898 | A | * | 1/1989 | Martinez ....................... 375/219 |
| 5,068,864 | A | * | 11/1991 | Javan ............................... 372/32 |
| 5,446,421 | A | * | 8/1995 | Kechkaylo .................... 332/100 |
| 5,881,110 | A | * | 3/1999 | Cochran ....................... 375/324 |
| 6,748,194 | B2 | * | 6/2004 | Oh et al. ...................... 455/11.1 |
| 7,164,669 | B2 | | 1/2007 | Li et al. |
| 7,414,965 | B2 | | 8/2008 | Wolf et al. |
| 7,693,191 | B2 | * | 4/2010 | Gorday et al. ................ 370/515 |
| 7,706,765 | B2 | | 4/2010 | Collins et al. |
| 8,089,791 | B2 | * | 1/2012 | Yang ............................... 363/97 |
| 8,238,955 | B2 | * | 8/2012 | Senda ........................... 455/502 |
| 2004/0009783 | A1 | | 1/2004 | Miyoshi |
| 2004/0130704 | A1 | * | 7/2004 | Beller et al. .................. 356/73.1 |
| 2011/0003543 | A1 | * | 1/2011 | Laufer ......................... 455/3.02 |
| 2011/0229145 | A1 | * | 9/2011 | Smith et al. .................. 398/136 |

* cited by examiner

*Primary Examiner* — Natali N Pascual Peguero
(74) *Attorney, Agent, or Firm* — Booth Udall Fuller, PLC

(57) ABSTRACT

A method of hitless switching over a communications link, the method comprising transmitting, by a first modulator to a remote receiver, a first carrier signal having a first center frequency, enabling, by a second modulator to the remote receiver, transmission of a second carrier signal having a second center frequency while the first modulator is transmitting the first carrier signal, increasing, through the second modulator, a power level of the second carrier signal while the first carrier signal is transmitting, simultaneously decreasing, through the first modulator, a power level of the first carrier signal while the power level of the second carrier signal is increasing, and disabling transmission of the first carrier signal to the remote receiver when the power level of the second carrier signal reaches a predetermined level.

42 Claims, 16 Drawing Sheets

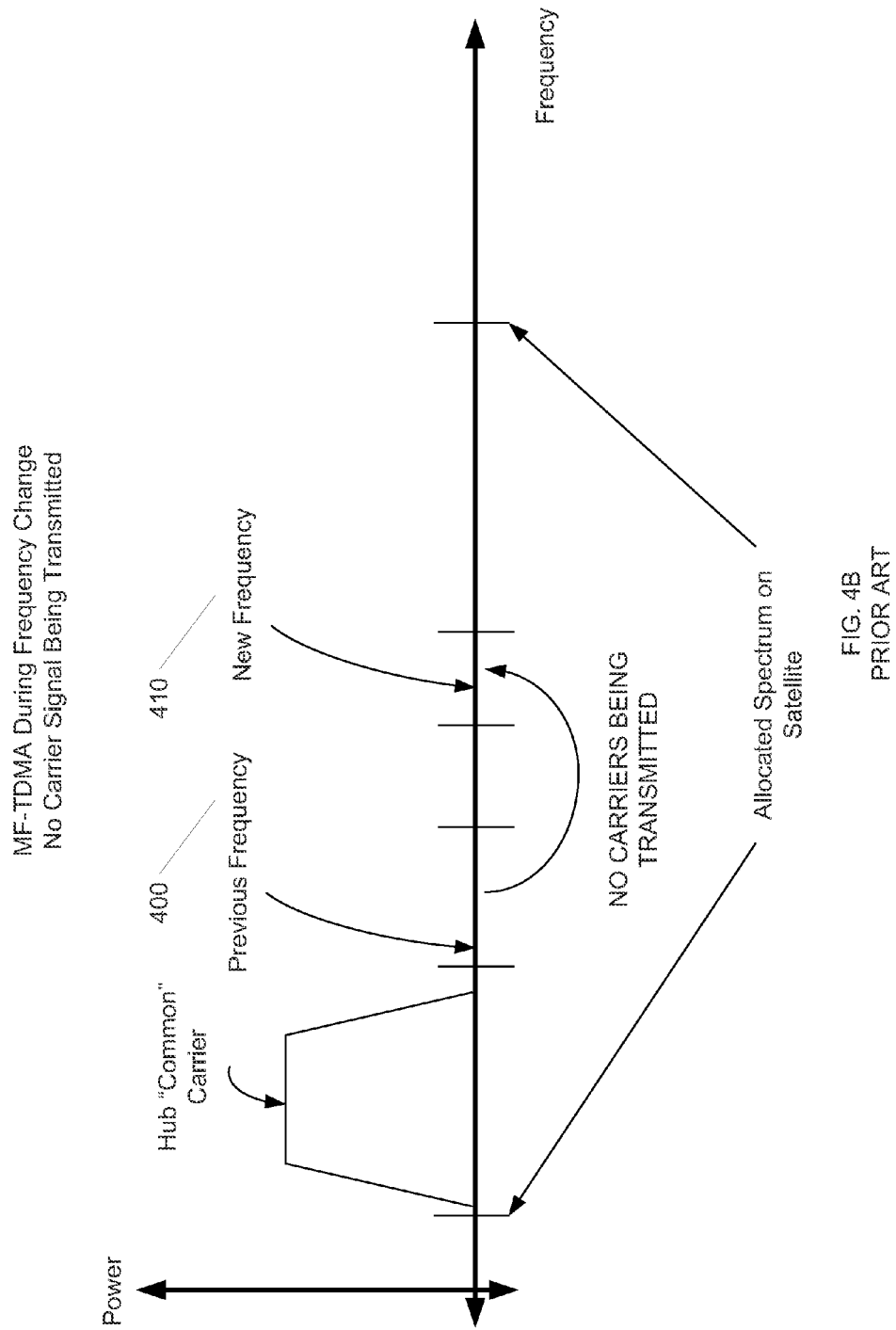

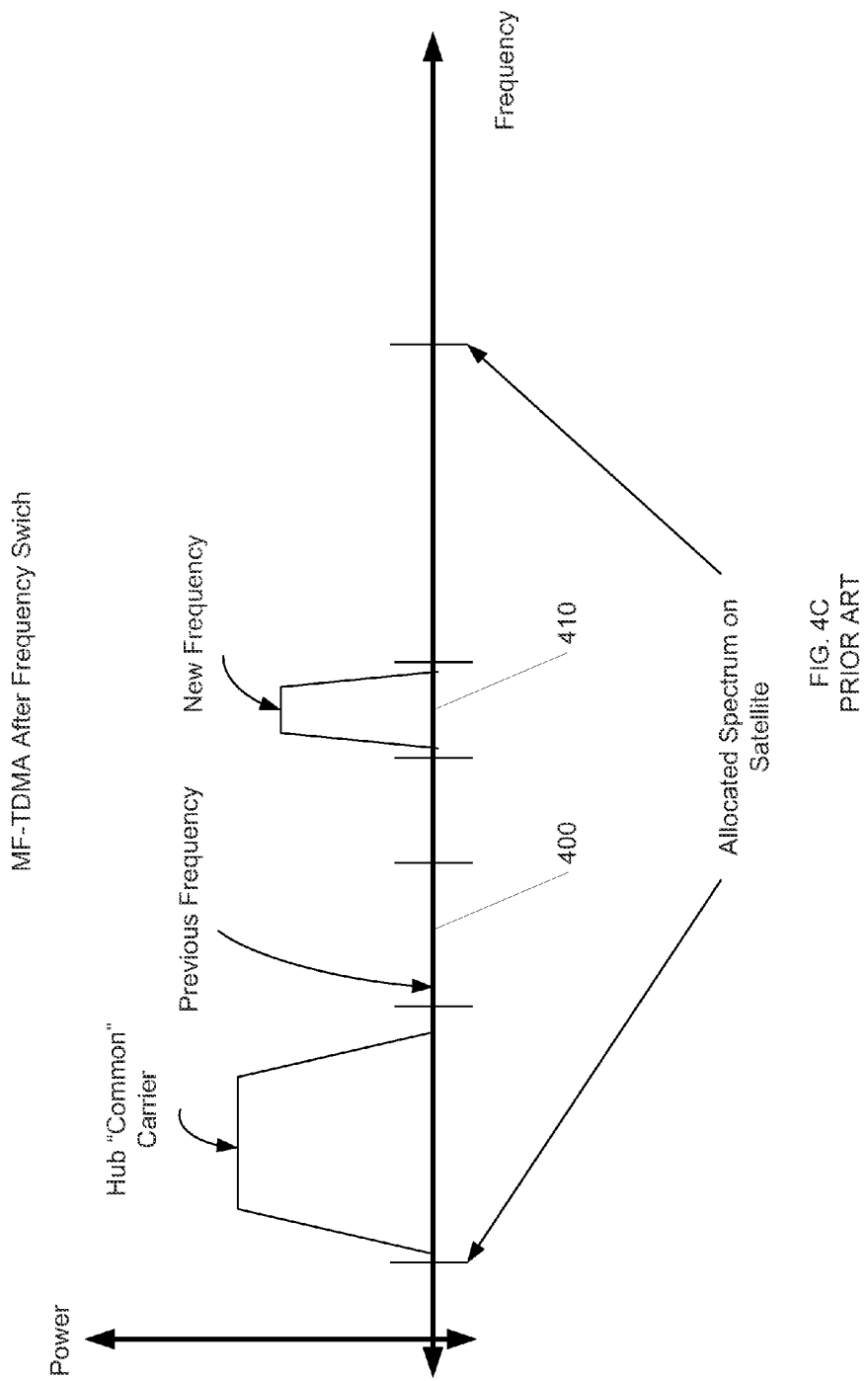

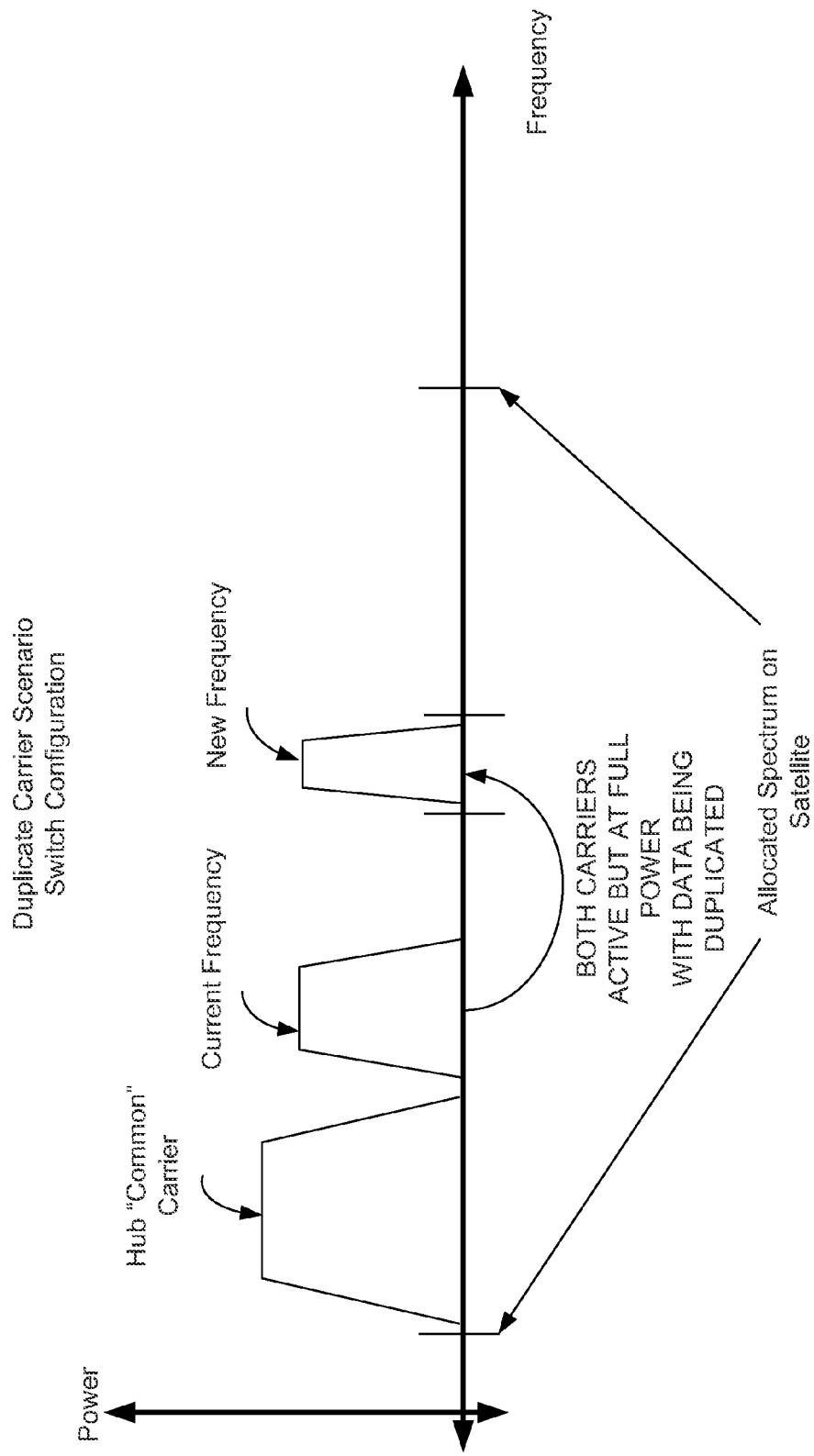

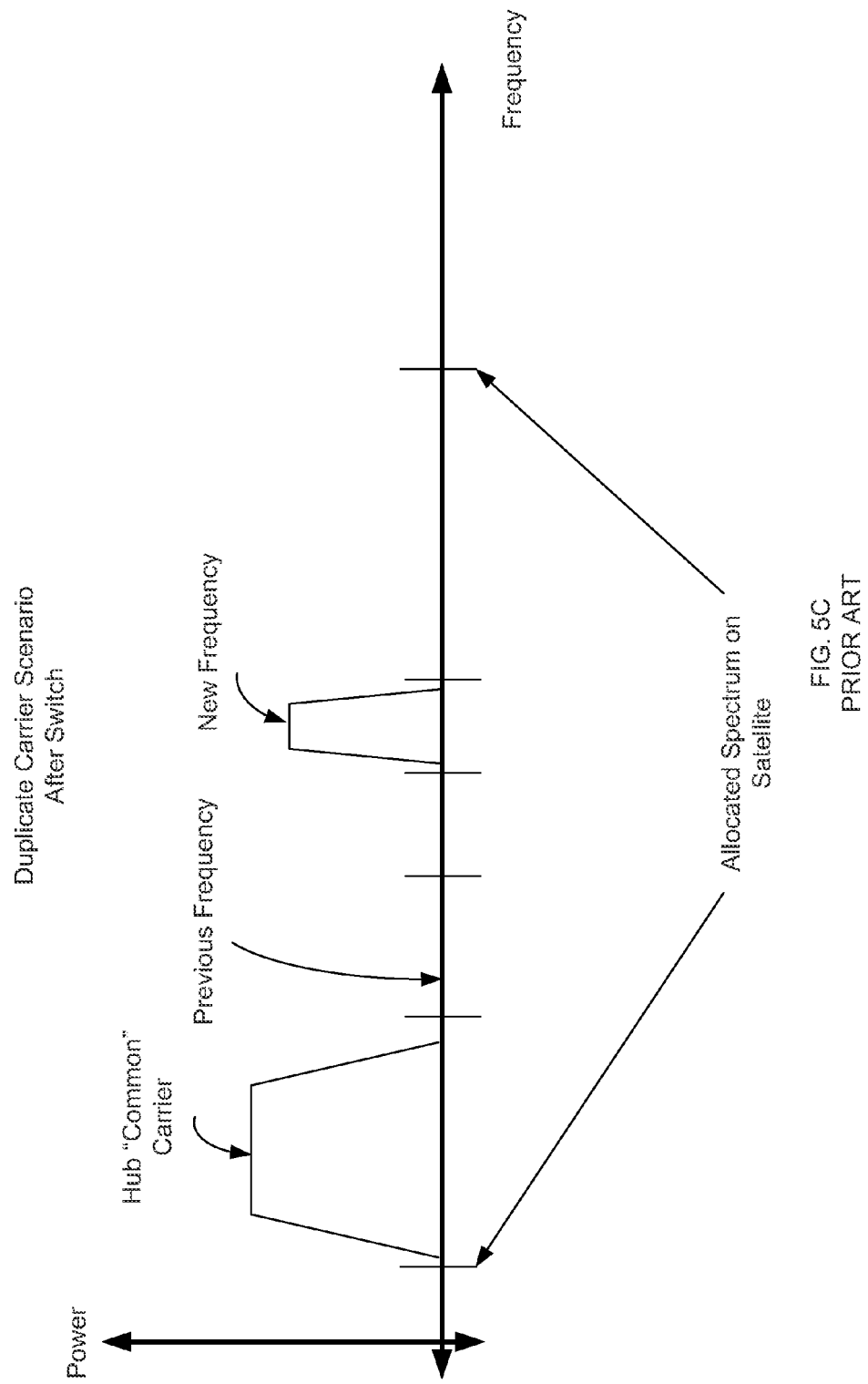

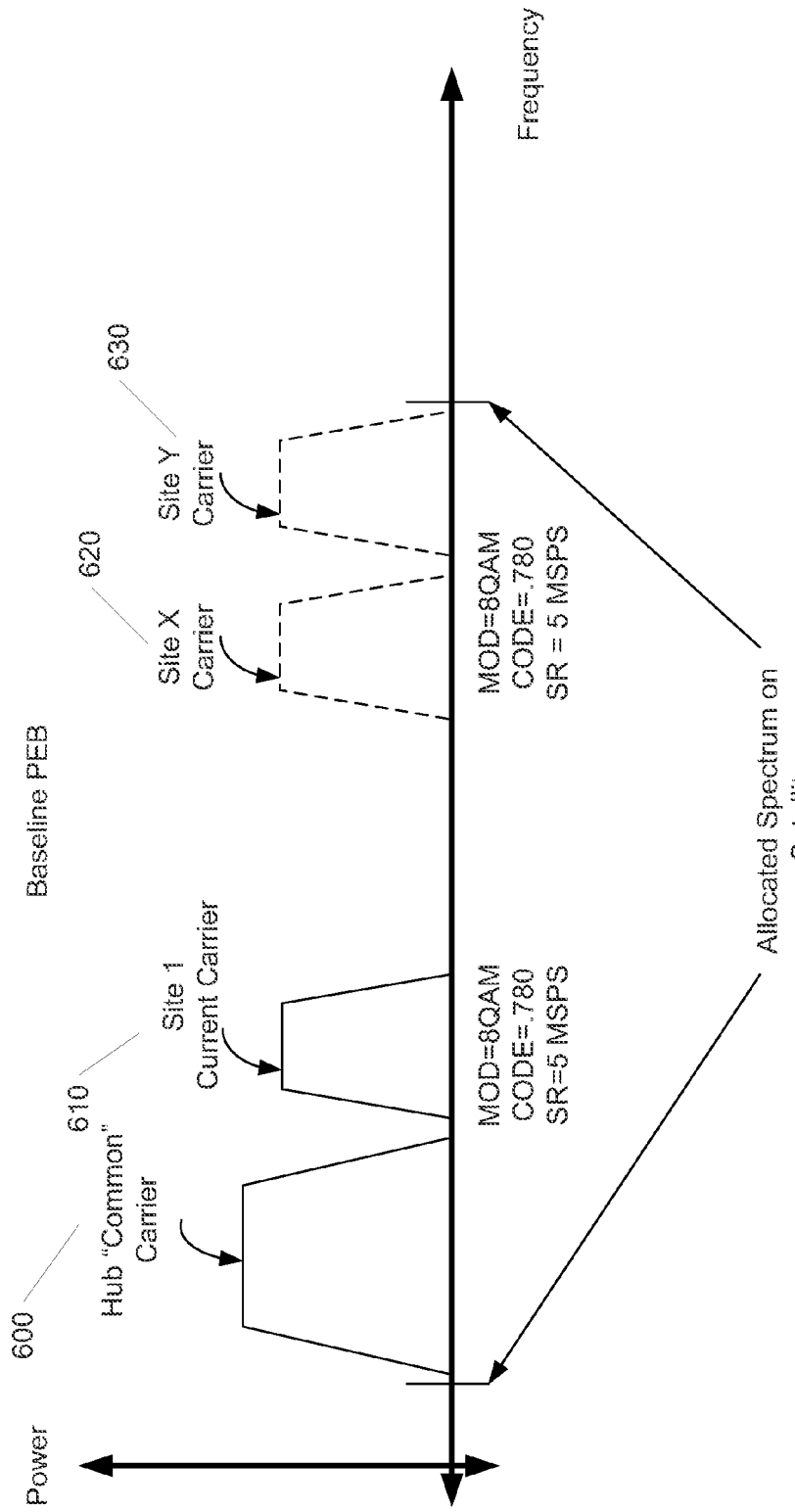

| MODCOD | MODULATION INDEX | FEC RATE | Spectral Efficiency | Eb/No | Es/No |
|---|---|---|---|---|---|
| 0 | 1 (BPSK) | 0.488 | 0.4876 | 2.400 | -0.716 |
| 1 | 2 (QPSK) | 0.533 | 1.0669 | 2.200 | 2.478 |
| 2 | 2 (QPSK) | 0.631 | 1.2620 | 2.800 | 3.811 |
| 3 | 2 (QPSK) | 0.706 | 1.4111 | 3.300 | 4.798 |
| 4 | 2 (QPSK) | 0.803 | 1.6061 | 3.800 | 5.857 |
| 5 | 3 (8-QAM) | 0.642 | 1.9273 | 4.600 | 7.447 |
| 6 | 3 (8-QAM) | 0.711 | 2.1338 | 5.200 | 8.490 |
| 7 | 3 (8-QAM) | 0.780 | 2.3403 | 5.600 | 9.292 |
| 8 | 4 (16-QAM) | 0.731 | 2.9254 | 6.300 | 10.954 |
| 9 | 4 (16-QAM) | 0.780 | 3.1205 | 7.000 | 11.942 |
| 10 | 4 (16-QAM) | 0.829 | 3.3155 | 7.500 | 12.706 |
| 11 | 4 (16-QAM) | 0.853 | 3.4130 | 8.000 | 13.330 |

FIG. 8

METHOD AND SYSTEM FOR PROVIDING HITLESS SWITCHING WHILE MAINTAINING A POWER EQUIVALENT BANDWIDTH (PEB) RATIO USING MULTIPLE CARRIERS

CROSS REFERENCE TO RELATED APPLICATIONS

This document claims the benefit of the filing date of U.S. Provisional Patent Application No. 61/578,774, entitled "A Method and System for Providing Hitless Switching While Maintaining a Power Equivalent Bandwidth (PEB) Ration Using Multiple Carriers" to Wallace Davis et al., which was filed on Dec. 21, 2011, the disclosure of which is hereby incorporated entirely by reference herein.

BACKGROUND

1. Technical Field

Aspects of this document relate generally to telecommunication systems and techniques for transmitting data across a telecommunication channel.

2. Background Art

The ability to dynamically switch from one frequency to a second frequency is known in the art as a "hop." The duration of time between when a change in frequency is initiated and when the change is finally made is the result of many factors. The electronics involved in the generation of the carrier signal must be disabled, re-tuned and then enabled. In addition to the device generating the carrier signal, a receiving device realizes the termination of the transmission carrier signal and must then re-tune and acquire the carrier signal once it is again enabled. The duration of time when the transmitter is disabled results in an outage and thus is not "hitless." A hitless transmission would not involve in an outage.

So as to reduce the complexity and length of the Detailed Description, and to fully establish the state of the art in certain areas of technology, Applicants herein expressly incorporate by reference all of the following materials identified in each numbered paragraph below.

U.S. Pat. No. 7,414,965 to Wolf et al., entitled "HITLESS PROTECTION SWITCH," issued Aug. 19, 2008.

U.S. Pat. No. 7,164,669 to Li, et al., entitled "MULTI-CARRIER COMMUNICATION WITH TIME DIVISION MULTIPLEXING AND CARRIER-SELECTIVE LOADING," issued Jan. 16, 2007.

U.S. Pat. No. 6,870,808 to Li, et al., entitled "CHANNEL ALLOCATION IN BROADBAND ORTHOGONAL FREQUENCY-DIVISION MULTIPLE ACCESS/SPACE-DIVISION MULTIPLE-ACCESS NETWORKS," issued Mar. 22, 2005.

U.S. Pat. No. 7,414,994 to Li et al., entitled "MULTI-CARRIER COMMUNICATION WITH TIME DIVISION MULTIPLEXING AND CARRIER-SELECTIVE LOADING," issued Aug. 19, 2008.

Applicants believe that the material incorporated above is "non-essential" in accordance with 37 CFR 1.57, because it is referred to for purposes of indicating the background of the invention or illustrating the state of the art. However, if the Examiner believes that any of the above-incorporated material constitutes "essential material" within the meaning of 37 CFR 1.57(c)(1)-(3), Applicants will amend the specification to expressly recite the essential material that is incorporated by reference as allowed by the applicable rules.

SUMMARY

Implementations of a method of hitless switching over a communications link may comprise transmitting, by a first modulator to a remote receiver, a first carrier signal having a first center frequency, enabling, by a second modulator to the remote receiver, transmission of a second carrier signal having a second center frequency while the first modulator is transmitting the first carrier signal, and increasing, through the second modulator, a power level of the second carrier signal while the first carrier signal is transmitting. Implementations of the method may further comprise simultaneously decreasing, through the first modulator, a power level of the first carrier signal while the power level of the second carrier signal is increasing, and disabling transmission of the first carrier signal to the remote receiver when the power level of the second carrier signal reaches a predetermined level.

Particular implementations may comprise one or more of the following features. The method may further comprise adjusting a modulation factor of the first carrier signal as the power level of the first carrier signal is decreased. The method may further comprise adjusting a FEC rate of the first carrier signal as the power level of the first carrier signal is decreased. The method may further comprise adjusting a modulation factor and a FEC rate of the first carrier signal as the power level of the first carrier signal is decreased. Transmission of the second carrier signal may be enabled at a power level equal to or below the decrease in power level of the first carrier signal. The method may further comprise adjusting a modulation factor of at least one of the first and second carrier signals. The method may further comprise adjusting a FEC rate of at least one of the first and second carrier signals. The method may further comprise adjusting a modulation factor and a FEC rate of at least one of the first and second carrier signals.

The method may further comprise transmitting, by the second modulator, a training sequence at the second center frequency. The method may further comprise beginning an acquisition of a lock by a demodulator at the remote receiver of the second carrier signal at the second center frequency. The method may further comprise acquiring, by the demodulator, a lock to the second carrier signal at the second center frequency and transmitting, by the demodulator, a command to the first modulator to cease transmission of the first carrier signal at the first center frequency and a command to the second modulator to transmit all data via the second carrier signal at the second center frequency. The first modulator may stop transmitting the first carrier signal and the second modulator transmits all data via the second carrier signal without receiving a command from the remote receiver. The method may further comprise outputting, by the demodulator, valid data from the second carrier signal at the second center frequency. The method may further comprise disabling and removing output power to a demodulator configured to receive the first carrier signal. The method may further comprise raising the power level of the second carrier signal. The method may further comprise adjusting a modulation factor of the second carrier signal after transmission of the first carrier signal has ceased. The method may further comprise adjusting a FEC rate of the second carrier signal after transmission of the first carrier signal has ceased. The method may further comprise adjusting a modulation factor and a FEC rate of the second carrier signal after transmission of the first carrier signal has ceased.

The method may further comprise maintaining a predetermined power equivalent bandwidth (PEB) of the communications link while the power level of the second carrier signal is increased and the power level of the first carrier signal is simultaneously decreased. The method may further comprise maintaining the predetermined PEB of the communications link while adjusting at least one of a modulation factor and a FEC rate of the first carrier signal as the power level of the first carrier signal is lowered. The method may further comprise transmitting, by the second modulator, a training sequence at the second center frequency while maintaining the predetermined PEB of the communications link. The first modulator may stop transmitting the first carrier signal and the second modulator transmits all data via the second carrier signal without receiving a command from the remote receiver while maintaining the predetermined PEB of the communications link. The method may further comprise outputting, by the demodulator, valid data from the second carrier signal at the second center frequency while maintaining the predetermined PEB of the communications link.

Implementations of a system for hitless switching over a communications link may comprise a first modulator configured to transmit to a remote receiver a first carrier signal having a first center frequency and decrease a power level of the first carrier signal, and a second modulator configured to enable transmission of a second carrier signal having a second center frequency to the remote receiver while the first modulator is transmitting the first carrier signal, simultaneously increase a power level of the second carrier signal while the power level of the first carrier signal is decreased by the first modulator, and disable transmission of the first carrier signal to the remote receiver, when the power level of the second carrier signal reaches a predetermined level.

Particular implementations may comprise one or more of the following features. The first modulator may be further configured to adjust a modulation factor of the first carrier signal as the power level of the first carrier signal is lowered. The first modulator may be further configured to adjust a FEC rate of the first carrier signal as the power level of the first carrier signal is lowered. The first modulator may be further configured to adjust a modulation factor and a FEC rate of the first carrier signal as the power level of the first carrier signal is lowered. Transmission of the second carrier signal may be enabled at a power level equal to or below the decrease in power level of the first carrier signal. The system may be further configured to adjust a modulation factor of at least one of the first and second carrier signals. The system may be further configured to adjust a FEC rate of at least one of the first and second carrier signals. The system may be further configured to adjust a modulation factor and a FEC rate of at least one of the first and second carrier signals. The second modulator may be further configured to transmit a training sequence at the second center frequency.

The system may further comprise a demodulator at the remote receiver configured to begin an acquisition of a lock of the second carrier signal at the second center frequency. The demodulator may be further configured to acquire a lock to the second carrier signal at the second center frequency and transmit a command to the first modulator to cease transmission of the first carrier signal at the first center frequency and a command to the second modulator to transmit all data via the second carrier signal at the second center frequency. The first modulator may be further configured to stop transmitting the first carrier signal and the second modulator is configured to transmit all data via the second carrier signal without receiving a command from the remote receiver. The demodulator may be further configured to output valid data from the second carrier signal at the second center frequency. The system may be further configured to disable and remove output power to a demodulator configured to receive the first carrier signal. The system may be further configured to raise the power level of the second carrier signal. The system may be further configured to adjust a modulation factor of the second carrier signal after transmission of the first carrier signal has ceased. The system may be further configured to adjust a FEC rate of the second carrier signal after transmission of the first carrier signal has ceased. The system may be further configured to adjust a modulation factor and a FEC rate of the second carrier signal after transmission of the first carrier signal has ceased.

The system may be further configured to maintain a predetermined power equivalent bandwidth (PEB) of the communications link while the power level of the second carrier signal is increased and the power level of the first carrier signal is simultaneously decreased. The system may be further configured to maintain the predetermined PEB of the communications link while adjusting at least one of a modulation factor and a FEC rate of the first carrier signal as the power level of the first carrier signal is lowered. The second modulator may be further configured to transmit a training sequence at the second center frequency while maintaining the predetermined PEB of the communications link. The first modulator may be further configured to stop transmitting the first carrier signal and the second modulator is configured to transmit all data via the second carrier signal without receiving a command from the remote receiver while maintaining the predetermined PEB of the communications link. The demodulator may be further configured to output valid data from the second carrier signal at the second center frequency while maintaining the predetermined PEB of the communications link.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. §112, ¶ 6. Thus, the use of the words "function," "means" or "step" in the Description, Drawings, or Claims is not intended to somehow indicate a desire to invoke the special provisions of 35 U.S.C. §112, ¶ 6, to define the invention. To the contrary, if the provisions of 35 U.S.C. §112, ¶ 6 are sought to be invoked to define the claimed disclosure, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. §112, ¶ 6. Moreover, even if the provisions of 35 U.S.C. §112, ¶ 6 are invoked to define the claimed disclosure, it is intended that the disclosure not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

FIG. 4B is a prior art spectral representation of an MF-TDMA carrier signal while moving the center frequency.

FIG. 4C is a prior art spectral representation of an MF-TDMA carrier signal after moving the center frequency.

FIG. 5B is a prior art spectral representation of a duplicate carrier signal configuration while moving the center frequency.

FIG. 5C is a prior art spectral representation of a duplicate carrier signal configuration after moving the center frequency.

FIG. 6A is an implementation of a spectral representation showing a common hub carrier signal communicating with remote devices via multiple remote carrier signals.

FIG. 8 is a table showing an example of various modulation and FEC coding combinations (MODCOD) of a particular MODCOD configuration and the associated Eb/No and Es/No required to close the link.

DESCRIPTION

Figure 1:
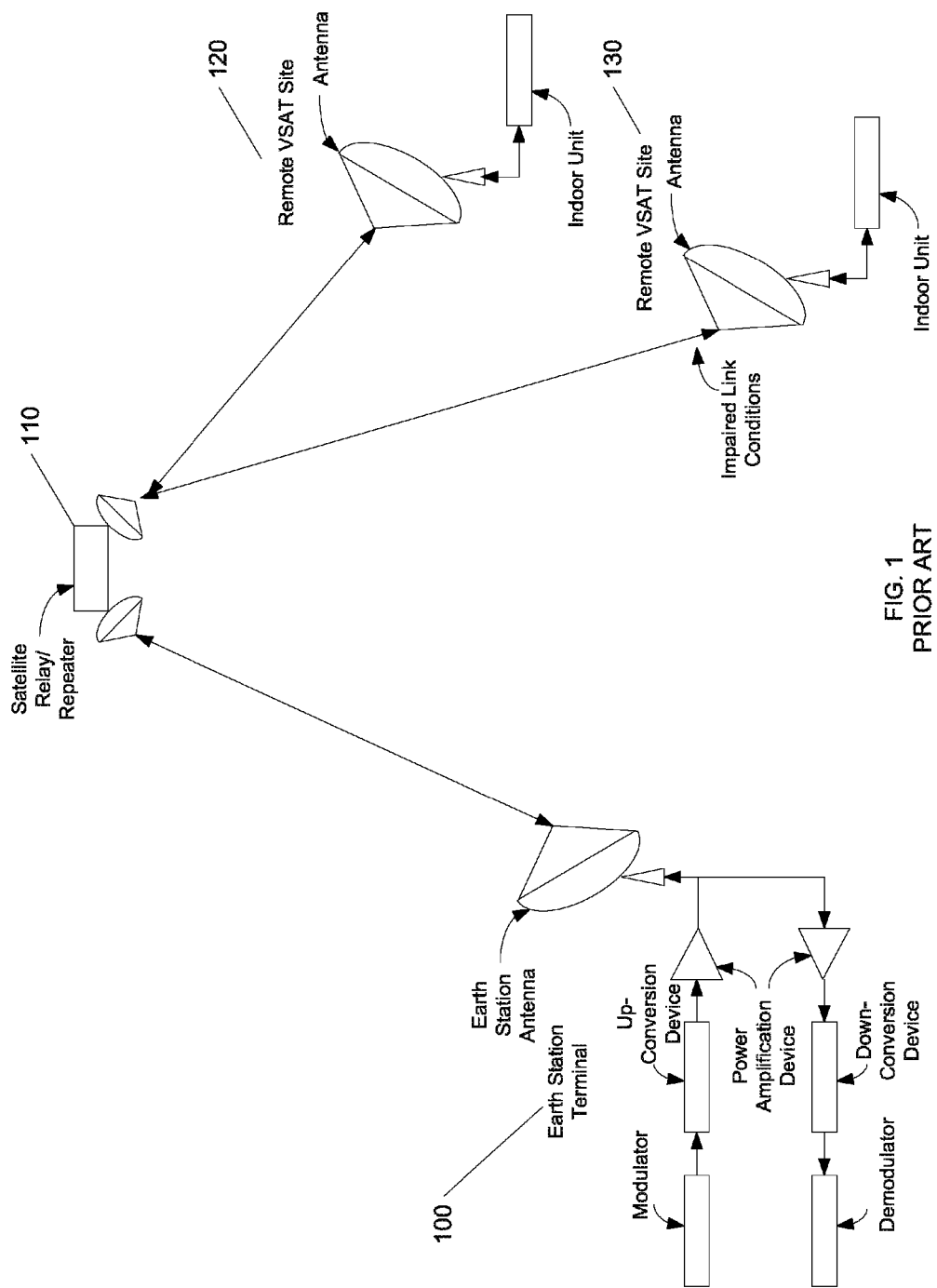
FIG. 1 is a representation of an implementation of a geographically diverse satellite network with a hub earth station terminal communicating with multiple remote sites.

This disclosure, its aspects and implementations, are not limited to the specific components, frequency examples, or methods disclosed herein. Many additional components and assembly procedures known in the art consistent with a method and system for providing hitless switching while maintaining a power-bandwidth ratio or as known in the art, the Power Equivalent Bandwidth (PEB) ratio, using multiple carrier signals are in use with particular implementations from this disclosure. Accordingly, for example, although particular implementations are disclosed, such implementations and implementing components may comprise any components, models, versions, quantities, and/or the like are known in the art for such systems and implementing components, consistent with the intended operation.

This disclosure relates to a method and system for providing hitless switching while maintaining a PEB ratio using multiple carrier signals. Implementations of the method provide the ability to transition from one carrier signal frequency to a second carrier signal frequency in a manner that results in hitless operation—at no time will communication be broken between the transmitter and remote device. The first carrier signal and the new carrier signal may be at different frequencies, symbol rates, Forward Error Correction (FEC), modulation type, spread spectrum spreading factor, spread spectrum polynomial, and the like.

Conventional systems use a redundant channel during a handoff period so that information is not lost. In contrast, the present disclosure is unique in the use of a training sequence to establish an independent link between the transmitter and receiver. Once the new link is established, data is sequentially routed to the new transmitting channel without redundancy to retain information integrity.

An aspect of novelty of the disclosure is the ability to regulate the power of the first carrier signal and the new carrier signal in a manner that prevents the amplifiers in the transmission path from being over driven. Over driving the amplifiers results in distortion or damage to the transmission chain.

Implementations of the described method and system may use an additional modulator that is enabled while the first modulator is enabled and active. The additional modulator is simultaneously enabled and allowed to transmit while the first carrier signal remains active. Once the second modulator is active and locked to the destination, the carrier signal for first modulator may be disabled.

An additional aspect of novelty of the present disclosure is that the power may be lowered on the first carrier signal when the new carrier signal is enabled. By properly controlling the power on the first and new carrier signals, the PEB ratio may be maintained, thus preventing the transmission equipment, such as amplifiers, from being over driven resulting in distortion or damage.

Implementations of the disclosed methods provide a control mechanism that modifies the modulation and FEC code (MODCOD) in a manner that allows the power to be reduced which results in lower user data throughput, enabling the new carrier signal with the appropriate modulation and FEC (MODCOD) at the appropriate power, and allowing the receiving device to achieve a lock to the new carrier signal. Once the new carrier signal is active, data transmission over the first carrier signal is disabled and the new carrier signal remains and becomes the primary carrier signal thereby resulting in no interruption or data duplication to service as is required in the existing art.

As background, devices that dynamically change frequency are subject to an outage (not hitless) when moving from one carrier signal frequency to a second frequency due to the need to re-tune a Phase-Locked Loop (PLL)/Synthesizer at the transmitter and the receiver must once again attempt to capture/acquire the carrier at a new center frequency. The entire operation results in a duration of time where no data is flowing over the link, resulting in "jitter" to the link, since there is no communications path between the source and destination. The described method provides a true hitless (non-interrupted) path between the transmitter and receiver.

The ability to control the power on the first and new carrier signal provides a methodology for ensuring the amplifying devices in the transmission path do not become over driven resulting in saturation (distortion) or damage to the devices.

To achieve the hitless switch, as power is decreased to prepare for the activation of the new carrier signal, the modulation and coding (MODCOD) may be adjusted (lower modulation index and additional FEC) resulting in lower bits per second per Hertz (bps/Hz), thus decreasing the throughput from the site during the switch. When the new carrier signal is enabled, the power may be adjusted to ensure the total power remains the same from the transmit site to maintain the PEB ratio. When the new carrier signal is enabled and the receiver is locked, the first carrier signal may be disabled and power increased on the new carrier signal (the only remaining carrier signal) to be the same PEB ratio as the first carrier signal.

This disclosure relates to, but is not limited to a method and system for providing hitless switching while maintaining a PEB ratio using multiple carrier signals technique. For point-to-point, point-to-multipoint and multipoint-to-multipoint networks, that provide transmission from a source to a destination and my utilize a repeating relay such as a space-based satellite repeating relay or an airborne repeating relay, the need to change center frequencies may be required due to lack of bandwidth or the type of carrier located at the present assignment. Regardless of the reason for the need or desire to move the carrier, this disclosure describes a method that provides a method and system for changing in center frequency of a carrier signal in a hitless (no data outage) manner.

Conventional systems use a redundant channel during a handoff period so that information is not lost. In contrast, the present disclosure is unique in the use of a training sequence, comprising a unique pattern that is known to the receiver to allow rapid detection of this known sequence to expedite the acquisition and lock to the carrier signal, resulting in an independent link between the transmitter and receiver. Once the new link is established, data is sequentially routed to the new transmitting channel while retaining information integrity, and no user data is duplicated.

One novelty of particular implementations of the described methods and systems provides the ability to dynamically switch from one carrier signal configuration to a new carrier signal configuration by allowing the first carrier signal to be remain active for the duration of the switch, though at a reduced power and resulting lower data rate, while an new carrier signal is simultaneously activated and allowed to lock to the receiving device, also at a reduced power level, and then the user data is terminated on the first carrier signal and then switched to the new carrier signal. Once the switch has taken place, then the first carrier signal is taken down, and the new carrier signal becomes the remaining carrier signal, and the power is raised to the same PEB ratio as the first carrier signal's level.

As background, an amplifier has a finite amount of power that may be provided for amplification, so the described methods and systems may be applied to ground, airborne or space-based devices that contain amplification devices. More specifically, a repeating relay's transponder (frequency converter/amplifier), for example, but not limited to satellite communications, may be 36, 54, or 72 MHz and careful planning may be maintained to ensure the transponder's amplifiers are not over driven (resulting in them being driven into saturation). Saturation is known as "compression" or "P1 dB" and is defined as a condition where the transponder's output power decreases by one (1) Decibel (dB) for one (1) dB of input power. Satellite operators carefully monitor the amount of power that each transponder is supporting and the amount of frequency spectrum each assigned carrier signal occupies. When a customer purchases services from a transponder, two aspects (quantities) are assigned: power and bandwidth. The combination of the two is known in the art as the PEB ratio.

As an additional novelty of the disclosure, when the first carrier signal is taken down and the new carrier signal is activated, the power may be adjusted on the two carrier signals in a manner that allows the PEB ratio to remain constant. During the time of the switch where both carrier signals are active, the MODCOD on the carrier signals must be adjusted to allow the link to remain operational, though at a reduced data rate. Once the data has been switched from the first carrier signal to the new carrier signal, the first carrier signal may be taken down (deactivated) and the power may be increased on the new carrier signal. As the power is increased, the MODCOD may be adjusted to an appropriate level for operation and user data rate.

Implementations of the described method and system do not impose any restriction on the first or second carrier signals and the carrier signals do not have to be the same modulation, FEC type, FEC rate, etc.

Particular implementations of a method and system for providing hitless switching while maintaining a PEB ratio using multiple carrier signals techniques disclosed herein may be specifically employed in satellite communications systems. However, as will be clear to those of ordinary skill in the art from this disclosure, the principles and aspects disclosed herein may readily be applied to any electromagnetic (IF, RF and optical) communications system, such as terrestrial broadcast network without undue experimentation.

The described methods pertain to satellite technology, but the methods and systems described are not limited to satellite technology, and may be applied to ground, airborne and space-based networks and systems. The need to change a center frequency is not a novel concept, but the conventional approach results in an interruption to service or a duplication of traffic while the switch takes place. Implementations of the described methods introduce the ability to provide a "hitless" way to change a carrier signal center frequency or configuration in a manner that does not result in a total outage—resulting in outage or jitter being experienced by the data flowing through a network. Additionally, there is prior art where hitless switching may be performed, but the result is a need for a duplicate carrier with no means for preventing the amplification devices in the path do not become overdriven or the PEB ratio is not increased or exceeded.

FIG. 1 shows a typical satellite configuration with three sites. A hub earth station terminal 100 is communicating over a satellite repeating relay 110 to two geographically diverse remote sites 120, 130. As shown in FIG. 1, power amplification devices are present at the hub earth station terminal 100, satellite repeating relay 110 and the remote VSAT site 120, 130.

Figure 2:
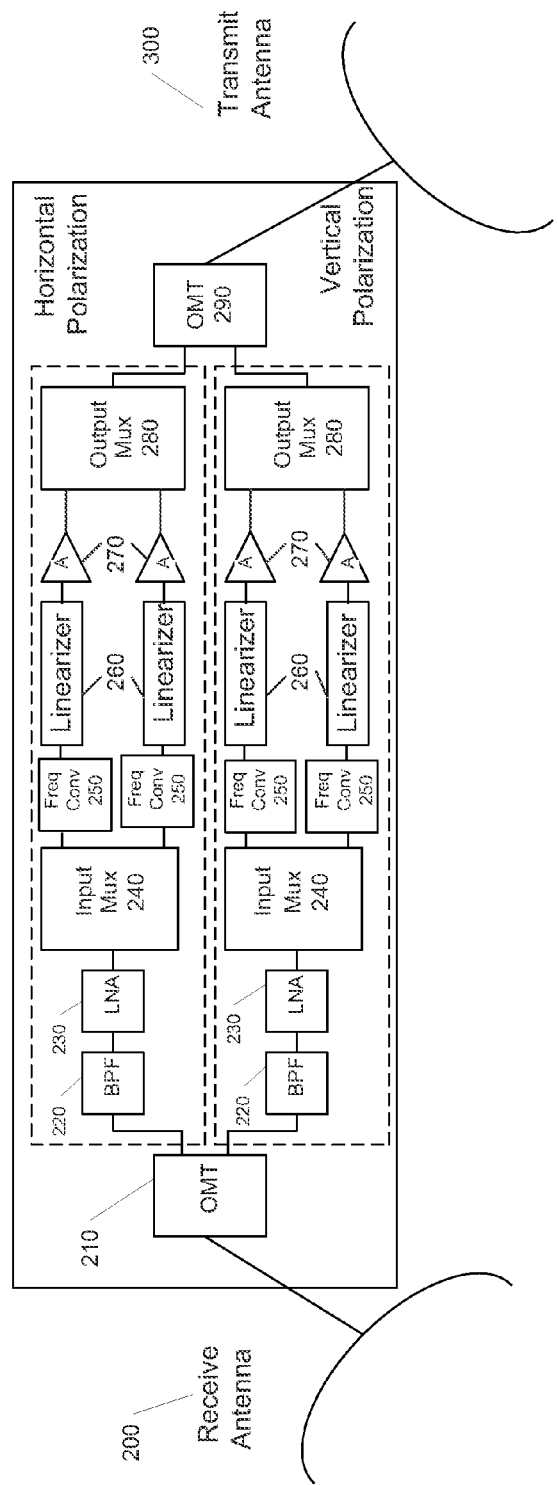
FIG. 2 is a representation of an implementation of a satellite-repeating relay showing the components to receive a carrier signal.
Figure 3:
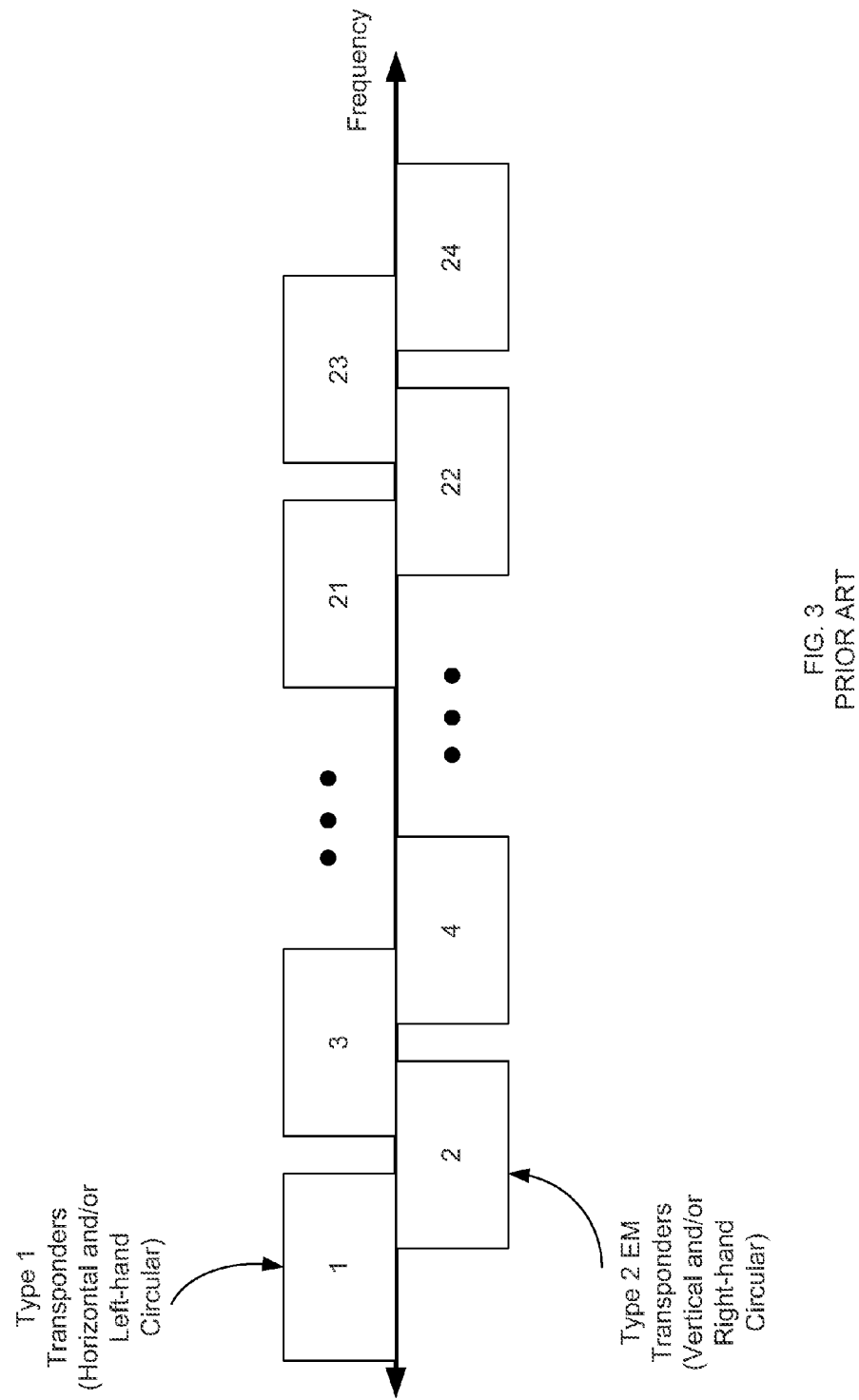
FIG. 3 is a representation showing an implementation of a typical satellite that contains multiple transponders in which odd transponders are of a first polarization type and even transponders are of a second polarization type.

FIG. 2 illustrates a typical satellite based repeating relay used in the art with no onboard processing. The repeating relay comprises an input (receive antenna) 200 which receives the incoming carrier signals, Orthogonal Mode Transducer (OMT) 210 that separates the various electromagnetic (EM) polarizations, Bandpass Filters (BPF) 220 that filter the frequency spectrum, a Low-Noise Amplifier (LNA) 230 that allows the received carrier signals to be power amplified, a multiplexer 240 which separates the various frequency spectra to the appropriate transponder and a frequency converter 250 to convert to the downlink frequency. The repeating relay further linearizes 260 any non-linearity due to the amplifiers, amplifies 270 before transmitting back to the destination, multiplexes 280 to the proper EM polarization configuration and feeds to the OMT 290 to the transmit antenna 300 feed for relay. The configuration of the transponders of the repeating relay may be comprised of a single transponder or a plurality of EM transponders with or without overlapping frequencies as shown in FIG. 3. FIG. 2 also shows the placement of the amplification devices denoted as "LNA" 230 and "A," 270 although the amplifier on the repeating relay that is of concern with regard to this disclosure is "A," 270 since it is a high-powered amplifier.

Figure 4A:
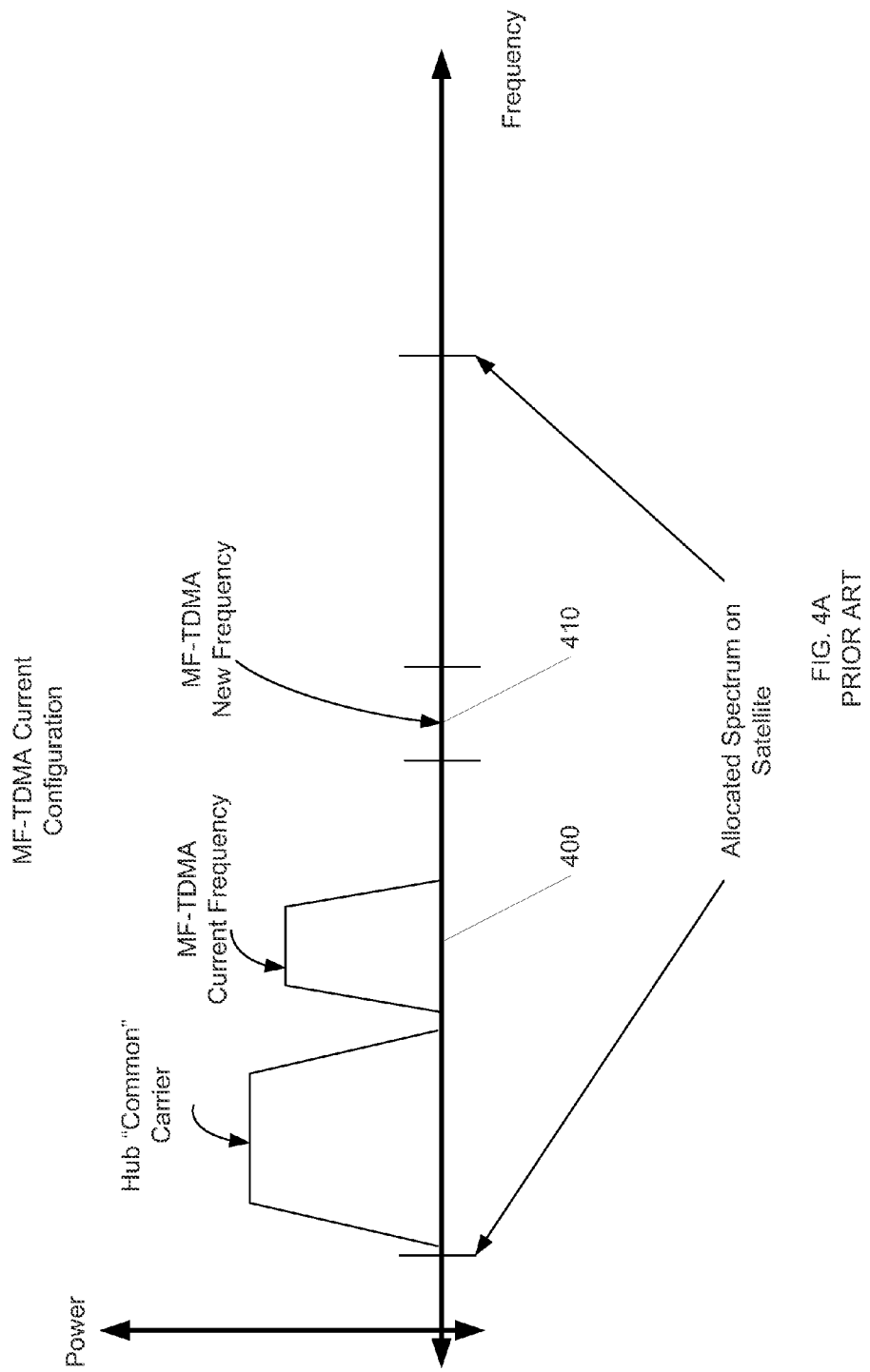
FIG. 4A is a prior art spectral representation of an MF-TDMA carrier signal prior to moving the center frequency.

The ability to move from one center frequency to another center frequency is a native function of Multiple Frequency-Time Division Multiple Access (MF-TDMA). As shown in FIGS. 4A-4C, a hub earth station may instruct a remote carrier signal to change the center frequency from a current frequency 400 to a new frequency 410 on a frame-by-frame basis or on demand for the duration of the switch. The carrier signal at the current center frequency 400 must be deactivated (turned off) and the synthesizer must be re-tuned to the new frequency 410. When the new center frequency 410 is set, transmission of the carrier signal is again enabled. During the time the carrier signal is disabled, no user traffic is flowing.

Figure 5A:
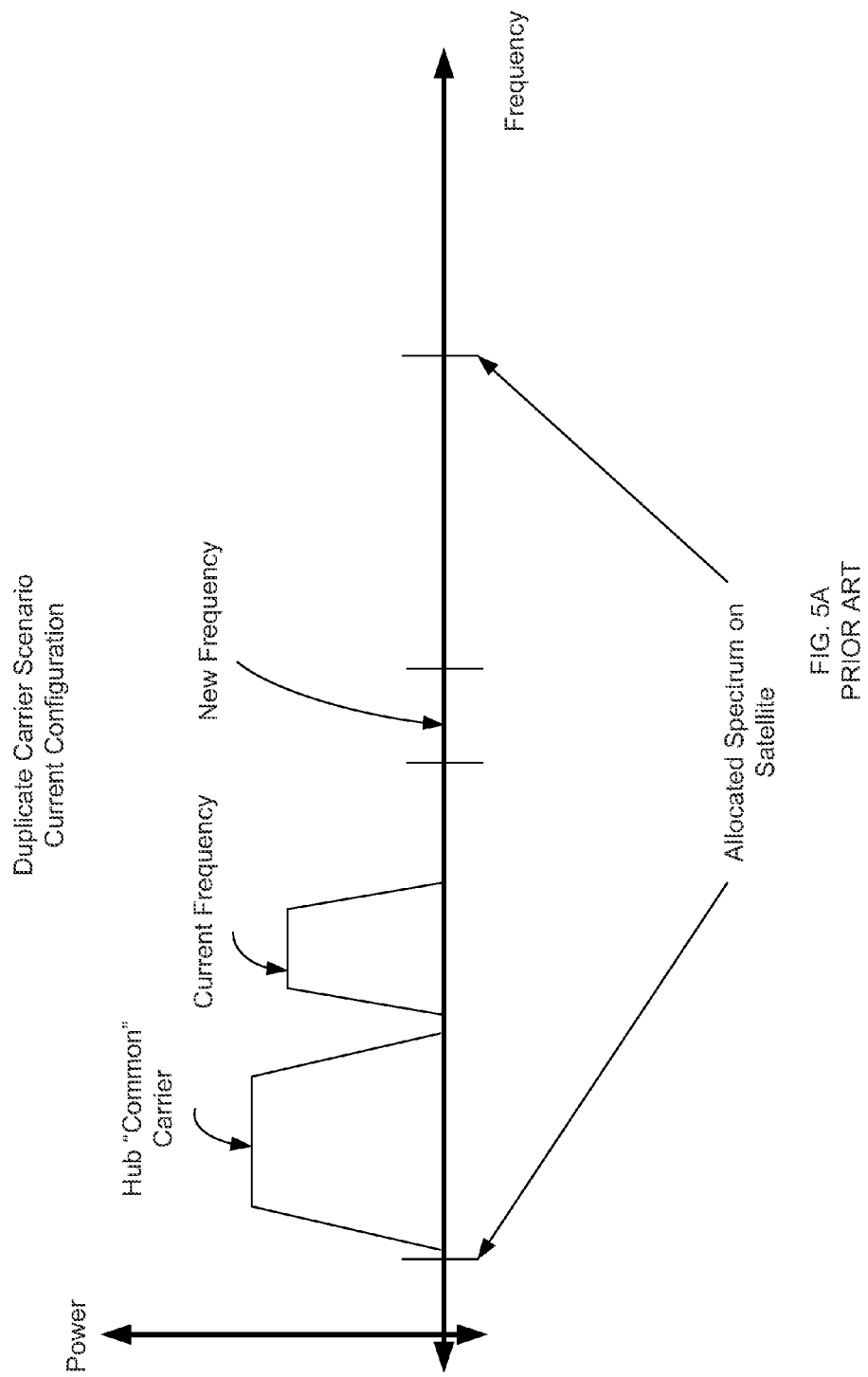
FIG. 5A is a prior art spectral representation of a duplicate carrier signal configuration prior to moving the center frequency.

Additionally, the ability to move from one center frequency or carrier signal configuration is accomplished in the prior art by using additional bandwidth and power and duplicating user data, with no compensation for power being consumed on the amplifiers in the transmission chain as shown in FIGS. 5A-5C.

FIG. 6A shows the baseline configuration of an implementation of the disclosed method in which the carrier signals are normalized. The hub "common" carrier signal 600 is the outbound carrier signal that provides the "common" outbound carrier signal that communicates with all of the remote terminals as shown in FIG. 1. The hub "common" carrier signal 600 is considered stationary and may remain at the same center frequency for operation. The return channel carrier signals are shown as site 1 carrier signal 610, site X carrier signal 620, and site Y carrier signal 630. The number of sites represents the number of carrier signals communicating back to the hub earth station. As can be observed in FIG. 6A, the baseline configuration for site 1 uses a specific power setting that provides a link budget that allows a modulation of 8-Quadrature Amplitude Modulation (8-QAM) with a FEC rate of 0.780 or MODCOD of 8QAM and 0.780 with a symbol rate of 5 Mega-symbols per second (5 Msps). FIG. 8 shows the relationship of the MODCODs and spectral efficiency to the required Es/No and Eb/No to maintain operation of the link. Sites X and Y are shown using a MODCOD of 8QAM and 0.780 FEC and 5 Msps. This configuration is considered to be operating at an optimal PEB ratio, or as known in the art as Power Equivalent Bandwidth (PEB).

Figure 6B:
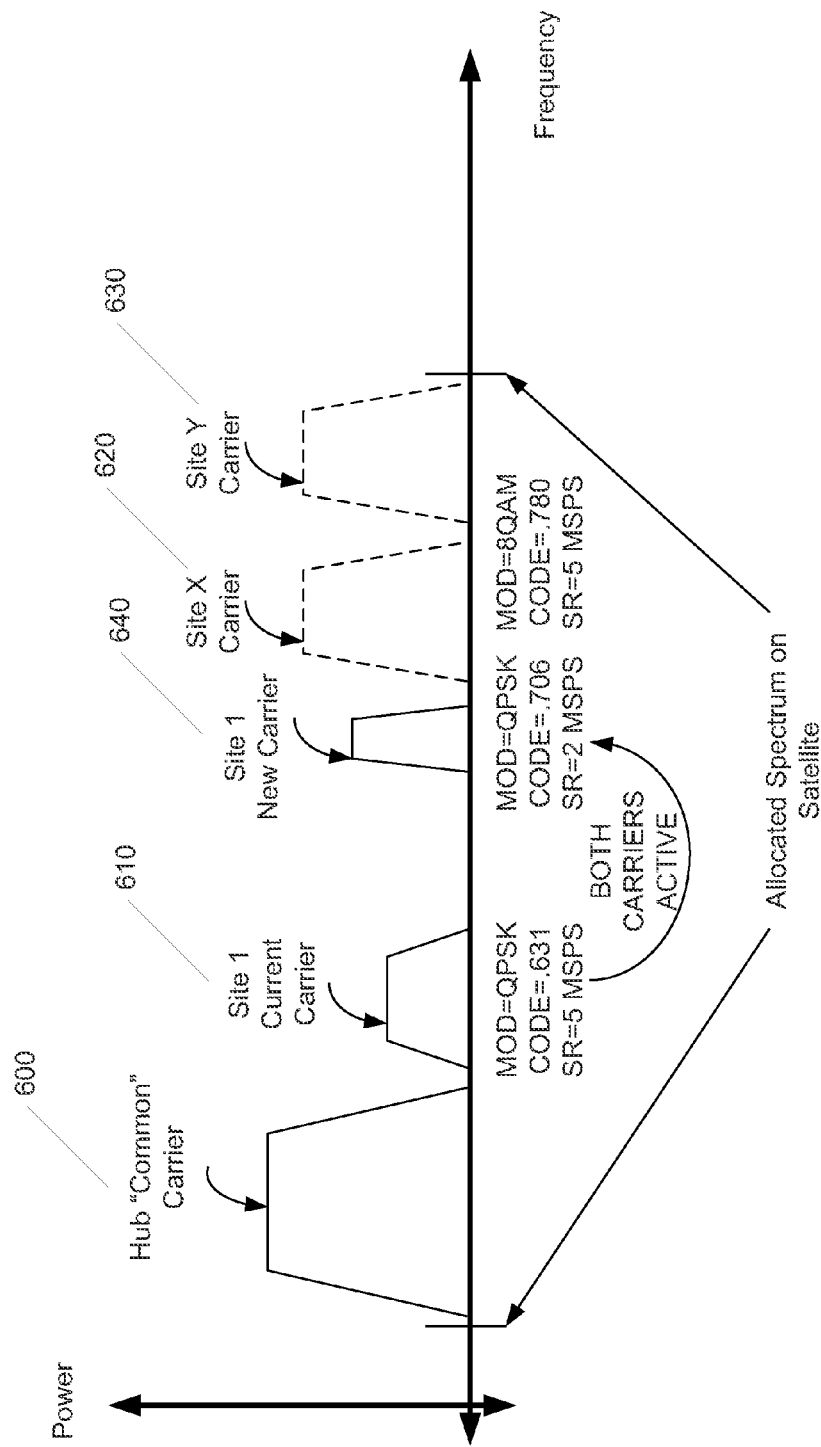
FIG. 6B is an implementation of a spectral representation showing a first carrier signal with reduced power and resulting MODCOD and a new carrier signal having reduced power and resulting MODCOD such that a PEB ratio is maintained.

FIG. 6B shows an implementation of the described method in which the site 1 carrier signal 610 needs to change center frequencies in a hitless fashion. First, the hub earth station instructs site 1 to lower the carrier signal power and as the carrier signal power is lowered, the MODCOD must be adjusted to compensate for the lower carrier signal power, e.g. keeping the link closed at a lower data rate (data throughput). When the power on the first site 1 carrier signal 610 is lowered to a level that will allow the new site 1 carrier signal 640 to be enabled, the new carrier signal 640 is enabled at a reduced power and the MODCOD is such that the link may be closed. For FIG. 6B, the new carrier signal 640 operates at a lower symbol rate and thus, is more spectrally efficient. Once the hub earth station confirms that the new carrier signal 640 is active, a command may be issued for the user data to cease on the first carrier signal 610 and be transitioned to the new carrier signal 640. At the time of the switch, the data may be flash cut. Upon the switch command, the first carrier signal 610 may be taken down (disabled) and the carrier signal power is raised on the new carrier signal 640 (now the primary or the "new" first carrier signal) and the MODCOD adjusted to a more spectrally efficient MODCOD.

Figure 6C:
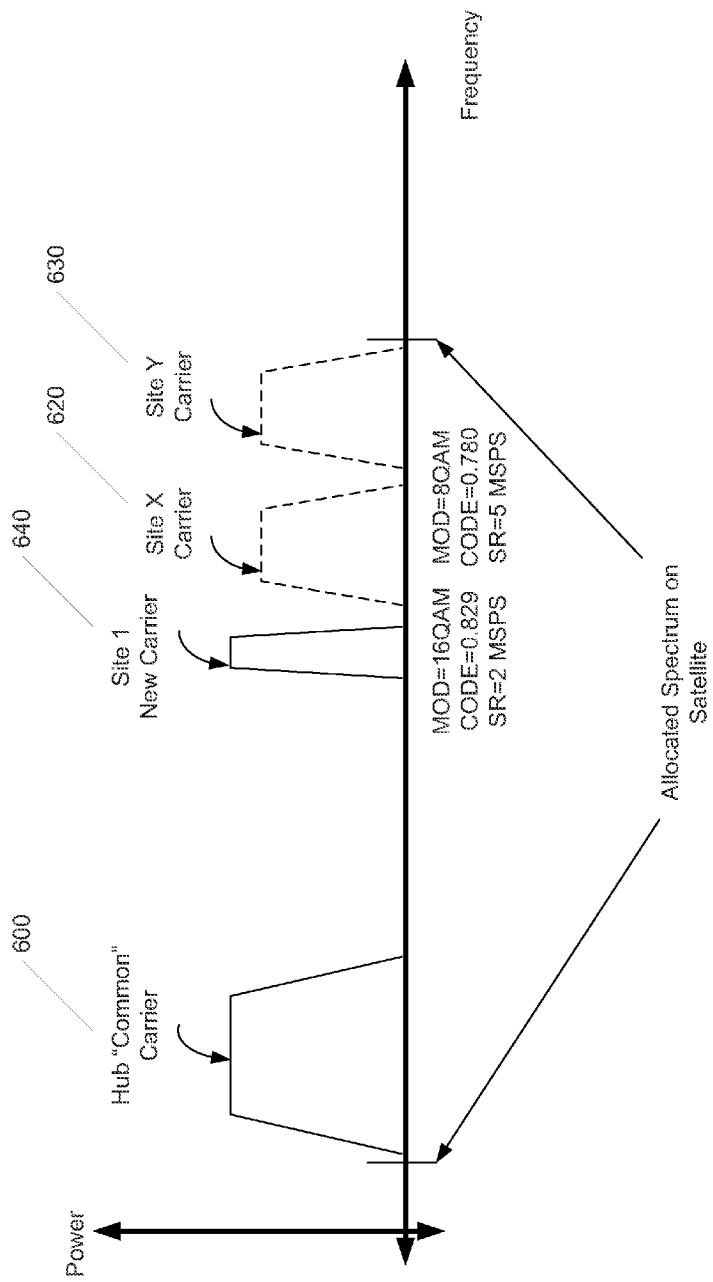
FIG. 6C is an implementation of a spectral representation showing a new carrier signal at the same PEB ratio as shown in FIG. 6A with a reduced symbol rate and increased power resulting in a same data rate.

FIG. 6C shows the final transition to the final configuration with the new carrier signal 640 now acting as a "new" first or primary carrier signal from site 1. As may be observed, the new carrier signal 640 or now known as the "new" first or primary carrier signal is operating at a lower symbol rate of 2 Msps, but with a higher carrier signal power and a more spectrally efficient MODCOD of 16QAM with 0.829 FEC.

Figure 7A:
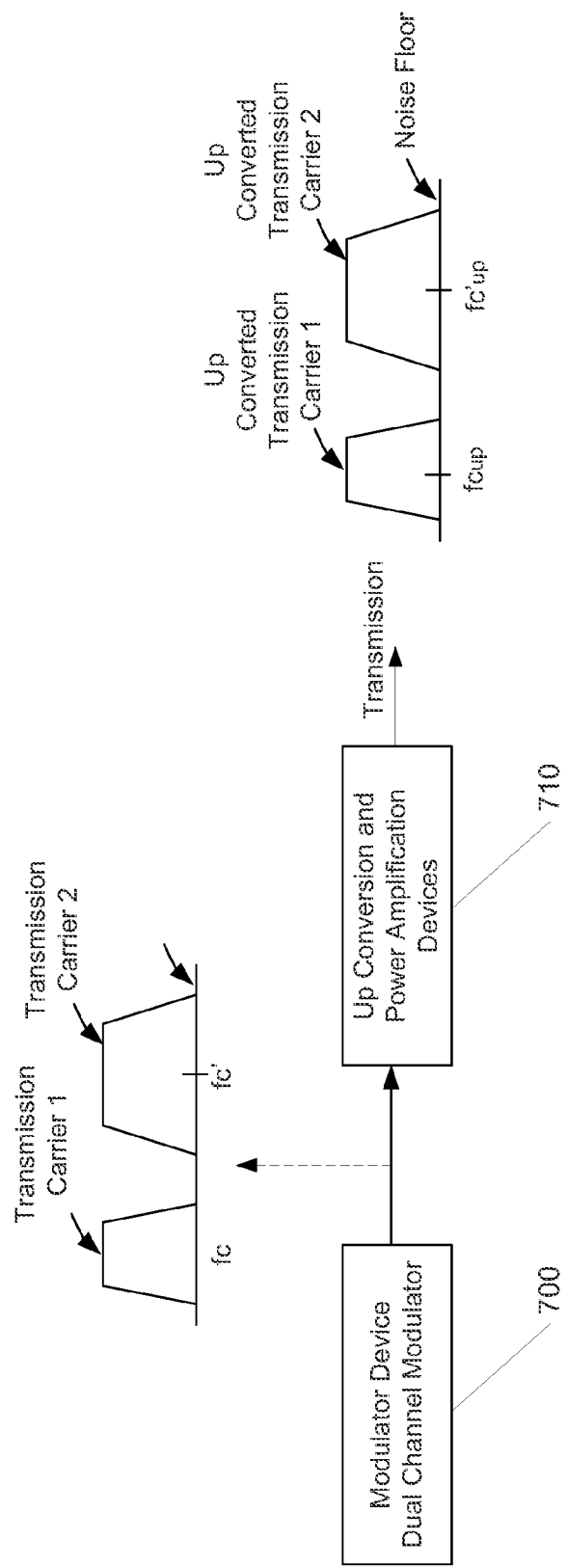
FIG. 7A shows an implementation of a system configuration with a single-multichannel modulator connected to a single transmission chain.

FIG. 7A shows an exemplary embodiment of a dual-channel modulator 700 that is coupled to an up-conversion device 710, resulting in the ability to provide two carrier signals from the same location. The user data is input into the single modulator devices and the result is a hub earth station may instruct the modulator to control power, center frequency, etc. using the described method.

Figure 7B:
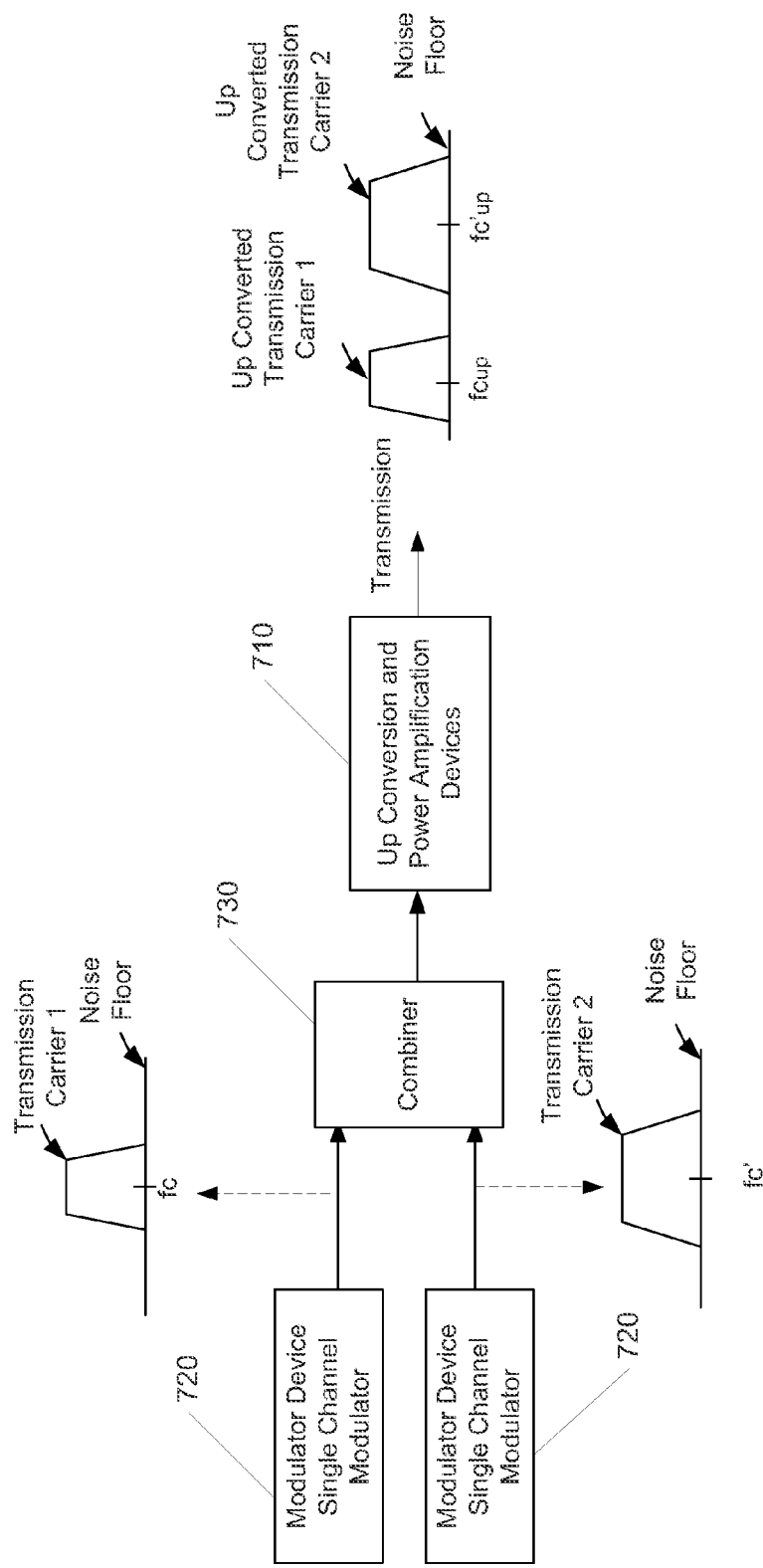
FIG. 7B shows an implementation of a system configuration with two single-channel modulators combined to a single transmission chain.

FIG. 7B shows an alternate embodiment of two single-channel modulators 720 that are coupled to a combiner 730 and sharing an up-conversion device 710, resulting in the ability to provide two carrier signals from the same location. The user data may be input into both devices and the result is a hub earth station may instruct both modulators to control power, center frequency, etc. using an implementation of the described methods.

Figure 7C:
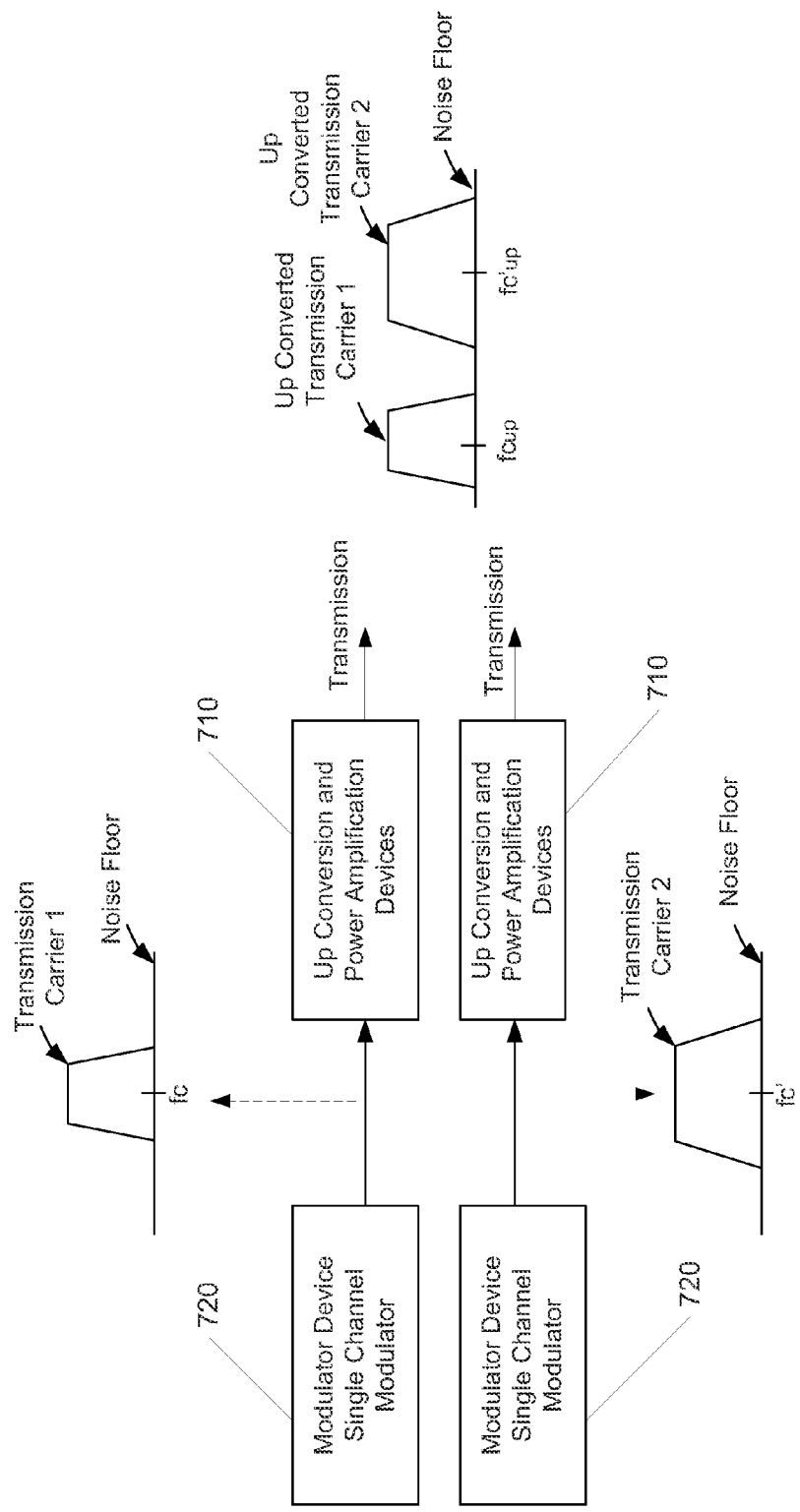
FIG. 7C shows an implementation of a system configuration with two single-channel modulators each connected a dedicated transmission chain.

FIG. 7C shows an alternate embodiment of two single-channel modulators 720 that are each coupled to a dedicated up-conversion device 710, resulting in the ability to provide two carrier signals from the same location. The user data may be input into both devices and the result is a hub earth station may instruct both modulators to control power, center frequency, etc. using an implementation of the described methods.

The following are particular implementations of methods and systems for providing hitless switching while maintaining a PEB ratio using multiple carrier signal techniques and are provided as non-limiting examples:

EXAMPLE 1

A satellite network is configured to operate a hub-spoke Very Small Aperture Terminal (VSAT) with a single hub earth station and three remote sites over a C-Band geostationary satellite repeating relay with 36 MHz transponders. The allocated satellite bandwidth is 10 MHz with the hub earth station occupying 4 MHz. Three sites are being supported and each occupy 1 MHz of bandwidth. One of the sites needs to be increased from 1 MHz to occupy 3 MHz. Using an implementation of the described method, this site has the carrier signal power reduced and the MODCOD adapted to allow communications with the hub earth station. The hub earth station instructs the site to bring up the new carrier signal using 3 MHz of the spectrum at a reduced power with a MODCOD that will allow communication with the hub earth station. Once the hub earth station locks to the carrier signal, a command is sent to the remote site to cease transmission of the first carrier signal and transition to transmitting the new carrier signal. Once the transition is complete, the hub earth station instructs the remote to disable the first carrier signal and raise the power on the additional (new primary) carrier signal and adjust the MODCOD to the assigned MODCOD, thus completing the switch with no loss or outage of the link and no duplication of transmitted data. While the transition is taking place, the PEB is monitored and the MODCODs and power are adjusted to ensure the maximum allowable PEB is not exceeded. In particular implementations of the system described in this Example, the satellite uses X-Band, Ku-Band, or Ka-Band, resulting in the same operation.

EXAMPLE 2

A satellite network is configured to operate a hub-spoke Very Small Aperture Terminal (VSAT) with a single hub earth station and eight remote sites over Ku-Band geostationary satellite repeating relay with 72 MHz transponders. The allocated satellite bandwidth is 72 MHz with the hub earth station occupying 40 MHz. Eight sites are being supported and each one is 3 MHz for a total of 24 MHz. One of the sites needs to be decreased from 3 MHz to occupy 2 MHz of bandwidth. Using an implementation of the described method, this site has the carrier signal power reduced and the MODCOD adapted to allow communications with the hub earth station. The hub earth station instructs the site to bring up the new carrier signal using 2 MHz of the spectrum at a reduced power with a MODCOD that will allow communication with the hub earth station. Once the hub earth station locks to the carrier signal, a command is sent to the remote site to cease transmission on the first carrier signal and transition to transmitting the new carrier signal. Once the transition is complete, the hub earth station instructs the remote site to disable the first carrier signal and raise the power on the additional (new primary) carrier signal and adjust the MODCOD to the assigned MODCOD, thus completing the switch with no loss or outage of the link and no duplication of data transmission. While the transition is taking place, the PEB is monitored and the MODCODs and power are adjusted to ensure the PEB is not exceeded. In particular implementations of the system described in this Example, the satellite uses C-Band, X-Band or Ka-Band, resulting in the same operation.

EXAMPLE 3

A satellite network is configured to operate a hub-spoke Very Small Aperture Terminal (VSAT) with a single hub earth station and ten remote sites over X-Band geostationary satellite repeating relay with 54 MHz transponders. The allocated satellite bandwidth is 34 MHz with the hub earth station occupying 4 MHz. Ten sites are being supported and each one is 2 MHz for a total of 20 MHz of bandwidth. One of the sites needs to be increased from 2 MHz to occupy 4 MHz of bandwidth. Using an implementation of the described method, this site has the carrier signal power reduced and the MODCOD adapted to allow communications with the hub earth station. The hub earth station instructs the site to bring up the new carrier signal using 4 MHz of the spectrum at a reduced power with a MODCOD that will allow communication with the hub earth station. Once the hub earth station locks to the carrier signal, a command is sent to the remote site to cease transmission on the first carrier signal and transition to the new carrier signal. Once the transition is complete, the hub instructs the remote site to disable the first carrier signal and raise the power on the additional (new primary) carrier signal and adjust the MODCOD to the assigned MODCOD, thus completing the switch with no loss or outage of the link and no duplication of data transmitted. While the transition is taking place, the PEB is monitored and the MODCODs and power is adjusted to ensure the PEB is not exceeded. In particular implementations of the system described in this Example, the satellite uses C-Band, Ku-Band, or Ka-Band, resulting in the same operation.

In places where the description above refers to particular implementations of hitless switching systems and methods, it should be readily apparent that a number of modifications may be made without departing from the spirit thereof and that these implementations may be applied to other hitless switching system and method implementations.

The invention claimed is:

1. A method of hitless switching over a communications link, the method comprising:
   transmitting, by a first modulator to a remote receiver, a first carrier signal having a first center frequency;
   enabling, by a second modulator to the remote receiver, transmission of a second carrier signal having a second center frequency while the first modulator is transmitting the first carrier signal;
   increasing, through the second modulator, a power level of the second carrier signal while the first carrier signal is transmitting;
   simultaneously decreasing, through the first modulator, a power level of the first carrier signal while the power level of the second carrier signal is increasing;
   maintaining a predetermined power equivalent bandwidth (PEB) of the communications link while the power level of the second carrier signal is increased and the power level of the first carrier signal is simultaneously decreased;
   maintaining the predetermined PEB of the communications link while adjusting at least one of a modulation factor and a FEC rate of the first carrier signal as the power level of the first carrier signal is lowered; and
   disabling transmission of the first carrier signal to the remote receiver when the power level of the second carrier signal reaches a predetermined level.

2. The method of claim 1, further comprising adjusting a modulation factor of the first carrier signal as the power level of the first carrier signal is decreased.

3. The method of claim 1, further comprising adjusting a FEC rate of the first carrier signal as the power level of the first carrier signal is decreased.

4. The method of claim 1, further comprising adjusting a modulation factor and a FEC rate of the first carrier signal as the power level of the first carrier signal is decreased.

5. The method of claim 1, wherein transmission of the second carrier signal is enabled at a power level equal to or below the decrease in power level of the first carrier signal.

6. The method of claim 5, further comprising adjusting a modulation factor of at least one of the first and second carrier signals.

7. The method of claim 5, further comprising adjusting a FEC rate of at least one of the first and second carrier signals.

8. The method of claim 5, further comprising adjusting a modulation factor and a FEC rate of at least one of the first and second carrier signals.

9. The method of claim 1, further comprising transmitting, by the second modulator, a training sequence at the second center frequency.

10. The method of claim 9, further comprising beginning an acquisition of a lock by a demodulator at the remote receiver of the second carrier signal at the second center frequency.

11. The method of claim 10, further comprising:
acquiring, by the demodulator, a lock to the second carrier signal at the second center frequency; and
transmitting, by the demodulator, a command to the first modulator to cease transmission of the first carrier signal at the first center frequency and a command to the second modulator to transmit all data via the second carrier signal at the second center frequency.

12. The method of claim 10, wherein the first modulator stops transmitting the first carrier signal and the second modulator transmits all data via the second carrier signal without receiving a command from the remote receiver.

13. The method of claim 10, further comprising outputting, by the demodulator, valid data from the second carrier signal at the second center frequency.

14. The method of claim 13, further comprising disabling and removing output power to a demodulator configured to receive the first carrier signal.

15. The method of claim 14, further comprising raising the power level of the second carrier signal.

16. The method of claim 15, further comprising adjusting a modulation factor of the second carrier signal after transmission of the first carrier signal has ceased.

17. The method of claim 15, further comprising adjusting a FEC rate of the second carrier signal after transmission of the first carrier signal has ceased.

18. The method of claim 15, further comprising adjusting a modulation factor and a FEC rate of the second carrier signal after transmission of the first carrier signal has ceased.

19. The method of claim 1, further comprising transmitting, by the second modulator, a training sequence at the second center frequency while maintaining the predetermined PEB of the communications link.

20. The method of claim 19, wherein the first modulator stops transmitting the first carrier signal and the second modulator transmits all data via the second carrier signal without receiving a command from the remote receiver while maintaining the predetermined PEB of the communications link.

21. The method of claim 19, further comprising outputting, by the demodulator, valid data from the second carrier signal at the second center frequency while maintaining the predetermined PEB of the communications link.

22. A system for hitless switching over a communications link, the system comprising:
a first modulator configured to:
transmit to a remote receiver a first carrier signal having a first center frequency; and
decrease a power level of the first carrier signal; and
a second modulator configured to:
enable transmission of a second carrier signal having a second center frequency to the remote receiver while the first modulator is transmitting the first carrier signal;
simultaneously increase a power level of the second carrier signal while the power level of the first carrier signal is decreased by the first modulator;
maintain a predetermined power equivalent bandwidth (PEB) of the communications link while the power level of the second carrier signal is increased and the power level of the first carrier signal is simultaneously decreased;
maintain the predetermined PEB of the communications link while adjusting at least one of a modulation factor and a FEC rate of the first carrier signal as the power level of the first carrier signal is lowered; and
disable transmission of the first carrier signal to the remote receiver, when the power level of the second carrier signal reaches a predetermined level.

23. The system of claim 22, wherein the first modulator is further configured to adjust a modulation factor of the first carrier signal as the power level of the first carrier signal is lowered.

24. The system of claim 22, wherein the first modulator is further configured to adjust a FEC rate of the first carrier signal as the power level of the first carrier signal is lowered.

25. The system of claim 22, wherein the first modulator is further configured to adjust a modulation factor and a FEC rate of the first carrier signal as the power level of the first carrier signal is lowered.

26. The system of claim 22, wherein the transmission of the second carrier signal is enabled at a power level equal to or below the decrease in power level of the first carrier signal.

27. The system of claim 26, further configured to adjust a modulation factor of at least one of the first and second carrier signals.

28. The system of claim 26, further configured to adjust a FEC rate of at least one of the first and second carrier signals.

29. The system of claim 26, further configured to adjust a modulation factor and a FEC rate of at least one of the first and second carrier signals.

30. The system of claim 22, wherein the second modulator is further configured to transmit a training sequence at the second center frequency.

31. The system of claim 30, further comprising a demodulator at the remote receiver configured to begin an acquisition of a lock of the second carrier signal at the second center frequency.

32. The system of claim 31, wherein the demodulator is further configured to:
acquire a lock to the second carrier signal at the second center frequency; and
transmit a command to the first modulator to cease transmission of the first carrier signal at the first center frequency and a command to the second modulator to transmit all data via the second carrier signal at the second center frequency.

33. The system of claim 31, wherein the first modulator is configured to stop transmitting the first carrier signal and the second modulator is configured to transmit all data via the second carrier signal without receiving a command from the remote receiver.

34. The system of claim 31, wherein the demodulator is further configured to output valid data from the second carrier signal at the second center frequency.

35. The system of claim 34, further configured to disable and remove output power to a demodulator configured to receive the first carrier signal.

36. The system of claim 35, further configured to raise the power level of the second carrier signal.

37. The system of claim 36, further configured to adjust a modulation factor of the second carrier signal after transmission of the first carrier signal has ceased.

38. The system of claim 36, further configured to adjust a FEC rate of the second carrier signal after transmission of the first carrier signal has ceased.

39. The system of claim 36, further configured to adjust a modulation factor and a FEC rate of the second carrier signal after transmission of the first carrier signal has ceased.

40. The system of claim 22, wherein the second modulator is further configured to transmit a training sequence at the second center frequency while maintaining the predetermined PEB of the communications link.

41. The system of claim 40, wherein the first modulator is configured to stop transmitting the first carrier signal and the second modulator is configured to transmit all data via the second carrier signal without receiving a command from the remote receiver while maintaining the predetermined PEB of the communications link.

42. The system of claim 40, wherein the demodulator is further configured to output valid data from the second carrier signal at the second center frequency while maintaining the predetermined PEB of the communications link.

* * * * *